Figure 1:
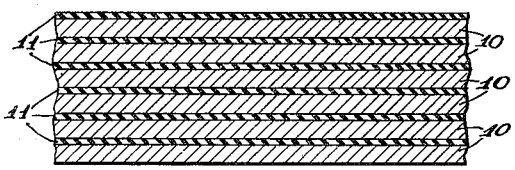

Nov. 19, 1940.　　　E. E. MAYER ET AL　　　2,221,983
LAYERED MAGNETIZABLE MATERIAL AND STRUCTURE FOR ELECTRICAL PURPOSES
Filed Feb. 25, 1938

INVENTORS
E. E. MAYER, P. SCHWARZKOPF
BY
ATTORNEY.

Patented Nov. 19, 1940

2,221,983

UNITED STATES PATENT OFFICE 2,221,983

LAYERED MAGNETIZABLE MATERIAL AND STRUCTURE FOR ELECTRICAL PURPOSES

Emil E. Mayer, New York, N. Y., and Paul Schwarzkopf, Reutte, Tyrol, Austria; said Schwarzkopf assignor to said Mayer Application February 25, 1938, Serial No. 192,498

4 Claims. (Cl. 175—21)

This invention relates to a layered magnetizable material and structure for electrical purposes, in particular electrical machines, devices and articles, and parts thereof, both for direct and alternating current.

It is an object of the invention to increase the chemical purity and thereby the permeability, and consequently the maximum induction obtainable, of magnetizable layers of such a structure, in particular to reduce their content of carbon and other admixtures influencing and reducing the permeability.

It is another object of the invention to adjust the electrical resistivity of such magnetizable layers at will, and in particular to increase it to a degree not obtainable heretofore.

It is another object of the invention to reduce the costs of manufacturing magnetizable layers of such structural material without reducing their permeability.

It is still another object of the invention to reduce the volume of the structural material for carrying the same flux in comparison to the amount of material used heretofore.

It is another object of the invention to increase the space factor, i. e., the ratio of active magnetizable material to the volume occupied by the entire structure of layered material. In particular, taking layered structural material made as heretofore and such material according to the present invention having magnetizable layers of the same width, the space factor or the ratio of the volume occupied by the magnetizable layers to the volume occupied by the entire structural body containing these layers is higher with the invention than heretofore.

Depending upon the use to which the structural material is to be put, it is still another object of the invention to adjust the remanence, and thereby the hysteresis losses, of the magnetizable layers contained in said material.

It is still another object of the invention to reduce the thickness of the insulating layers separating or covering the magnetizable ones.

It is still another object of the invention to more intimately connect the insulating layers with adjacent magnetizable layers.

It is still another object of the invention to reduce the costs of making such insulating layers.

It is still another object of the invention to produce a magnetizable body of substantial mechanical strength consisting of alternate layers of magnetizable and of insulating materials.

These and other objects of the invention will be more clearly understood when the specification proceeds with reference to the drawing.

Figure 2:
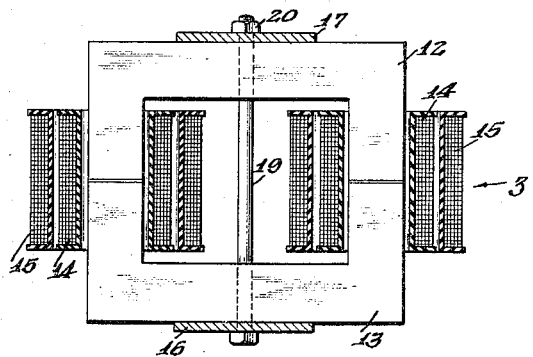
Figure 3:
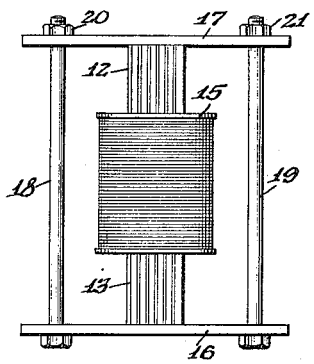
Figure 4:
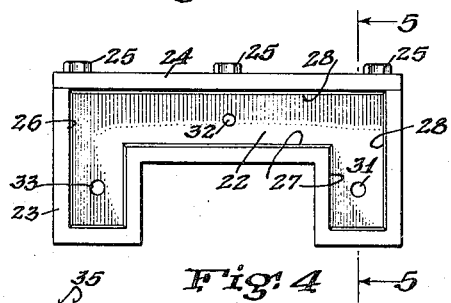
Figure 5:
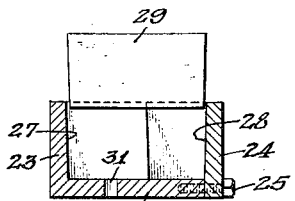
Figure 6:
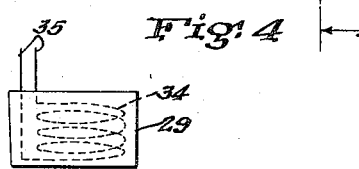
Figure 7:
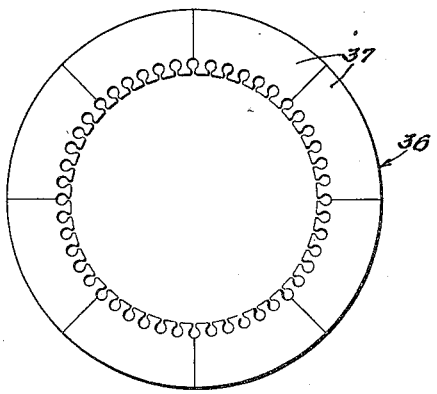

In the drawing Fig. 1 shows on a greatly enlarged scale a cross-section through a layered structure, Fig. 2 in cross-section and partly elevation a single-phase transformer and Fig. 3 a side elevation of the transformer seen in the direction of arrow III in Fig. 2; Fig. 4 shows a mold in plan view without pressure block and Fig. 5 a cross-section along the line V—V in Fig. 4 with inserted pressure block; Fig. 6 shows a modification of a pressure block; Fig. 7 the frame structure of an electrical machine and Fig. 8 a plan view of a part of a mold suitable to manufacture a frame according to Fig. 7.

It is to be understood that the invention is by no means limited to the features and exemplifications shown in the drawing.

Cores and other parts of transformers and electrical machinery, of apparatus and other electrical devices which carry a varying or alternating magnetic flux or are subject to a varying or alternating magnetic field, consist of material which permits high magnetic induction and should combine this quality with a reasonable permeability at high saturation. In addition thereto, losses occurring through hysteresis and eddy currents should be low. In order to reduce the eddy currents, the core, frame or other structure is built of laminations insulated from one another electrically. The magnetizable layers of such structures and materials consisted heretofore usually of sheets made of low carbon steel containing a certain amount of silicon. Such sheets have a standard thickness of a range of about 0.07 mm. to 0.75 mm. The difficulty of making such sheets and their cost necessarily increase with their reduced thickness; the thinner they are, the larger is the amount of handling.

With increasing requirements as to high permeability of the material, the purity of the material contained in the magnetizable layers was increased. Thus, the carbon content of the steel was reduced as far as possible and carbon-free, chemically pure iron would be most desirable for certain purposes, i. e., to obtain the highest induction. Elimination of the carbon content has also been attempted because any appreciable carbon content greatly increases the hysteresis losses.

It is, however, extremely difficult, if at all possible, to make such pure iron in any commercial process from ingots by rolling them into sheets.

By the use of iron of high purity or other high magnetic induction carrying metal the eddy currents, as a rule, are increased. Therefore, the iron had to be mixed with other material of lower electrical conductivity than that of iron. Preferably silicon was admixed, which is of low electrical conductivity and of practically no permeability. Here again arose the difficulty of commercially making sheets containing high amounts of silicon, and actually the art has succeeded only in making and rolling such steel in commercial grades containing up to about 4% to 4½% silicon. Looking for other admixtures care had to be taken to avoid those which affect other characteristics of the material such as its coercive force or remanent magnetism. Thus, cobalt, if added, increases the coercive force of the magnetic material, which is desirable only in particular instances. However, all such admixtures increase the difficulties of manufacturing the sheets of desired thinness and ductility and make it impossible to make the sheets by a rolling process beyond a certain limit. Also the sheets easily become too brittle to be used.

Such sheets have been provided with insulating layers such as very thin paper, or varnish, or silicate of potash, and then assembled. This type of manufacture was again expensive. The assembled cores or other structures were of comparatively low mechanical strength and usually had to be reenforced by more or less heavy additional mechanical structures.

According to the present invention at least one of the magnetizable layers of a layered magnetizable structure or material consists of compacted particles substantially, i. e. exceeding 50%, of magnetizable material. Furthermore, also insulating layers between those magnetizable layers can be made of compacted particles of non-conductive material. Ultimately, both the magnetizable and the electrical insulating layers may consist of such compacted particles, and the whole body is one compact unit.

Referring to the drawing, Fig. 1, the layers of magnetizable material 10 are separated from each other by layers 11 of insulating material. The magnetizable layers may be made in such a way that powder of magnetizable material of suitable size of its grain is spread over a desired area to the desired thickness and then compacted in any suitable way. Thus, pressure of e. g. 15,000 to 30,000 lbs. per square inch may be applied, or heat of a temperature between fritting and high sintering temperature of the material, or pressure and heat may be applied simultaneously or subsequently.

Upon one layer 10 made in this way an insulating layer 11 is to be applied. This can be done by spreading on it powdery insulating material again to a desired thickness, and this loose layer can then be compacted in the same way as described above for the first magnetizable layer, i. e. by applying pressure, by applying heat, or both. At the same time, this layer is compacted with the underlying layer of magnetic material. Upon the lowest insulating layer 11 thus produced, another layer 10 of magnetizable material is applied in the way described, and so forth until a stack of alternate magnetizable and electrically insulating layers is obtained offering the desired cross-section necessary to carry the magnetic flux, this whole stack forming a mechanically solid body.

Taking as an example the manufacture of a single-phase transformer shown in Figs. 2 and 3, the core consists of two U-shaped parts 12, 13 which are assembled after the coils 14, 15 are inserted between them. Cross bars 16, 17 are connected by bolts 18, 19 and nuts 20, 21.

It is understood that this construction has been taken as a simple example only, and the invention is by no means limited thereto.

The U-shaped core 12 or 13 can be made, for instance, in the following way:

A mold is taken having a base 22 and rims 23, 24. The rim 24 is removable by removing the bolts 25 or other suitable means. Furthermore, the inside of the walls 26, 28 is tapered by one or two degrees toward the rim 24 in a horizontal direction and also by one or two degrees upwardly in order to facilitate the removal of the finished U-shaped body from the mold as it is to be described later on.

The first layer consisting of powdery magnetizable material is spread upon the base 22 to desired thickness and thereupon a pressure block 29 fitting exactly inside the rims 23, 24 is lowered and compacts the particles of the first layer. Thereupon, the pressing block 29 is lifted, and a layer of powdery electrically insulating material is spread upon the compacted layer lying in the mold. Then the pressing block 29 is lowered again, and the insulating layer is compacted and also connected to some degree with the layer of magnetizable material which is underneath.

This process is repeated until the desired number of magnetizable and electrically insulating layers is obtained.

Thereupon the pressure block is removed and pins previously inserted in the holes 31, 32 and 33 of the base 22 with their upper surfaces lying flush with that of the base during the manufacture of the layered body as described above, are raised. Thereby the finished layered body is ejected.

In case the layers are to be compacted by application of heat, e. g. the block 29 has to be provided with suitable heating means, such as a coil 34 shown in dotted lines and insulatingly arranged within the block 29 in Fig. 6. The electric heating current is supplied through flexible conductors 35.

It is obvious that by this process the desired structure is obtained in its final shape ready for use, and there is no or only negligible finishing work to be applied after the layered body has been removed from the mold.

Figure 8:
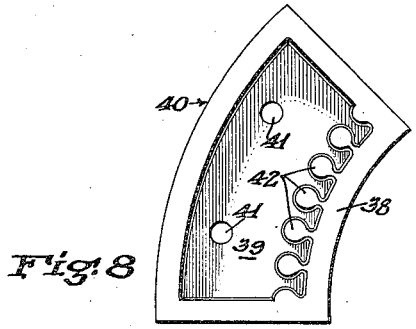

If it is intended to make a frame 36 of an electrical machine as shown in Fig. 7, a mold may be used as shown in Fig. 8 but only for making a part 37 of the frame 36. This mold comprises a base 39 with rims 38 and 40. Rim 38 is formed on its inside as a negative of the slots and teeth provided on the inside of the frame 36. Again, a rim 38 or 40 may be tapered by 1° or 2° upwardly as it has been explained with reference to Figs. 4 and 5. The frame 36 is then manufactured in a similar way as described before for the U-shaped core of a transformer. The pressure block which has to fit between the rims 38, 40 is not shown because its contour conforms with that of the insides of rims 38, 40.

Again, the finished compact body may be removed as a whole from the mold by means of ejectors fitted into the holes 41 of the base 39, and a strong self-supporting magnetizable structure for an electrical machine is obtained.

In such a case the rotor of the machine can be made in such a similar way as not to require additional description. A mold can be used therefor having rims tapered to the same degree as the rims 38, 40 on their inside so that the rotor will fit exactly into the frame 36 leaving a uniform air gap between them.

We have described only one performance of our invention using tapered walls for facilitating the removal of the final structure. It is obvious that other means can be used instead or besides those outlined above. Thus, we have shown in Fig. 4 a removable rim 24 and mentioned that the walls 26, 28 may be tapered in a horizontal direction toward the removable rim 24. In such a case, upward tapering of the walls 26, 27, 28 can be omitted and the finished structure can be easily removed after the bolts 25 have been taken off and the rim 24 removed. Applying this principle to the manufacture of stators or rotors for electrical machines, it is obvious that the tapered inside surface of the stator and the outside surface of the rotor can be dispensed with and exact cylindrical shapes can be obtained.

According to our invention, the magnetizable layers are manufactured of pure material the particles of which have a suitable size. These particles must in any case be smaller than the desired thickness of a layer. Taking into consideration that the average size of such sheets is about 0.1 mm. to 0.5 mm., we may say that the particles to be used for the magnetizable layer may be of a size between about 1 to 300 microns.

As far as the material is concerned, we prefer chemically pure iron group metal as it is obtainable on the market or, for instance, can be obtained from carbonyles in well-known processes. The pure iron can be obtained in a finely powdered state in the gas or vapor phase from its carbonyles. Iron group metal of too large a size of its particles can be reduced by suitable treatment, for instance, in ball mills, the balls of which consist of purest iron and the inside of which mills is also lined either with iron or other material which does not discharge undesired impurities into the iron.

The iron powder so obtained or prepared may then be spread over the base of the mold, as described above, or over electrically insulating layers produced thereon, by means of sieves or the like. If narrow spaces like those between the parts 42 in Fig. 8 are to be filled in order to form the teeth, the metal may be spread into these spaces by means of nozzles. To this effect, the iron powder is admixed with air, preferably under low super-atmospheric pressure, and an air-iron powder stream released into those spaces.

It is to be understood that any other than the described way of preparing the powdery layer may be used, and we do not want to confine ourselves to any particular process.

Incidentally, we may mention that a structure as shown in Fig. 7 may also be made in such a way that the core 36 is made in a mold where the inside of the rim 38 is cylindrical so that a frame structure is obtained having a cylindrical inside surface. The slots may then be applied by any mechanical process such as punching, milling or drilling. It is obvious that in such a case the number of layers connected into a unit has to be chosen so that the mechanical process is applicable without difficulties and without undue splintering. In such cases the principal advantages of the invention are also retained regarding the composition of the magnetizable and insulating layers, their thickness and their intimate connection.

The material used for the magnetizable layer may consist of iron, in particular purest iron as mentioned above. In case it is desired to influence or adjust the permeability and/or electrical resistivity of the material, any desired mixture may be used, such as of metal of the iron group, in general comprising a major portion of iron and a minor portion of cobalt and sometimes nickel. There may further be admixed substances of lower electrical conductivity than iron such as silicon, titanium, zirconium, antimony, tin, barium, beryllium, lead, cerium, lanthanium, niobium, strontium, tantalum. Alloys of two or more of these metals can also be used as far as they are capable of forming alloys. These admixtures are to be powdered like the metal of the iron group, preferably to the same size, and intimately mixed. Whereas up to date steels containing a maximum of 4% to 4.5% silicon could be commercially made, according to the present invention the silicon content can be considerably increased up to 30% and more, if desired. This is due to the fact that we do not employ a casting but a so-called metal-ceramic process in which said admixtures frit or sinter with the iron group metal. If they do not frit or sinter together, the admixtures are at least tightly encased in a skeleton formed by the fritted or sintered iron group metal.

In this manner we are able to produce a structural material or shaped body having, within limits, any desired permeability which may be evenly distributed throughout the body or vary at any desired place. Such variation can be accomplished by varying the composition of the powder which is spread in the mold. Furthermore, we may obtain such a variation over the entire body by making magnetizable layers of different compositions.

Instead of the metals mentioned above, or in addition to them, there may be used substances or compounds forming more or less electrical insulators, such as silica, silicates, titanium oxide, zirconia, boron oxide, tin oxide, alumina, and compounds thereof. These admixtures have to be in a powdery state, preferably of the same size of grains in which the iron group metal is used.

If, in some instances, it is desired to use a structural material having higher coercive force and/or some remanence, admixtures like e. g. cobalt, aluminum, nickel may be used for the magnetizable layer.

As far as the temperatures are concerned, if heat is used for compacting, they are to be between fritting and high sintering temperature, but below melting temperature. If the material is melted, saturated or unsaturated solutions may be formed which, upon cooling, could precipitate some of the material previously dissolved, and this would result in an undesired and disturbed structure and distribution of the material. In addition thereto, impurities and other undesired material might be absorbed by the melt, such as from the mold walls and the insulating layers to be formed, as we will describe it hereinafter. One of the outstanding features of our invention consists in substantially avoiding the molten phase of the mixture forming the magnetic layer.

The insulating layer may consist of any insulating material, such as alumina and its compounds, silica and its compounds, zirconia, titanium oxide, etc. Non-conductive compounds, including oxides of any element belonging to the second through six group and eight group of the Periodical System may be employed either singly or in suitable mixtures. The insulating material has to be powdered to a desired size of its particles, for instance to 1 to 20 microns, because the insulating layer, as a rule, has to be by far thinner than the magnetizable layer. Again, the powder may be spread upon a magnetizable layer just completed and then compacted by pressure and/or heat. The pressure may be the same as referred to for compacting the magnetizable layers, depending upon the minimum pressure at which a kind of cold flow starts.

If heat is used, or heat and pressure, the temperature of the heat applied should preferably not exceed high sintering temperature and be at least fritting temperature of the insulating material. The temperature should not exceed the high sintering temperature of the magnetizable layer so as to prevent its melting while the insulating layer is applied. If the magnetizable layer is melted, the powdery insulating material may penetrate into the magnetizable layer and entirely disturb its composition and structure.

On the other hand, it is desirable that the insulating and magnetizable mixtures may be chosen so that their fritting or sintering temperatures lie within the same range, making the insulating layer adhere closely to the magnetizable layer, and vice versa. With this procedure an extremely compact and coherent body of great mechanical strength is obtained.

It is understood that the particles of the insulating layer may consist of insulating compound, in particular oxide compound of material contained in the magnetizable layers. Insulating compounds, as for instance oxides of elements not contained in the magnetizable layers may be added in powdery finely divided form.

In particular, there may be used compounds of vitreous character, for instance of the silica-lime row having a melting point of about 1400° C., or lithium silicates, having a melting point between about 1050° C. and 1250° C., and calcium fluorites, or silica compounds thereof having a melting point between about 1380° C. to 1512° C. By properly selecting vitreous substances of the desired melting point, one may easily arrive at a powdery mixture, or powder, which sinters or melts at desired temperatures. These temperatures are determined by the melting temperature of the material contained in the magnetizable layer as we have explained above. Therefore, the vitreous substance has to be selected so that its melting temperature lies substantially, i. e. about 10% to 20%, below the melting temperature of material contained at least in the surface of the magnetizable layer. The compacting of the layer of insulating material can be done, as explained above, by application of pressure alone, or of heat, or of both, and, if a vitreous substance is present in the powder to form the insulating layer, the substance preferably should be heated to sintering temperature, in particular high sintering temperature, whereby the other insulating substance present in the layer will be combined by the vitreous substance into a dense and coherent layer which also adheres tightly to the magnetizable layer. Although the insulating layer may consist entirely of substances capable of vitrifying at the temperature applied, we prefer to compose an insulating layer of a major portion of insulating particles not capable of vitrifying, and a minor portion of vitreous substance. In particular, the vitreous substance may amount to between about 3% to 28% of the powdery mixture to form the insulating layer.

Instead of applying the insulating layer in powdery form or in addition thereto, we may proceed in the following way:

We form the magnetizable layer of material which consists of, or contains, material capable of forming an oxide compound, including an oxide itself, and compact the magnetizable layer under non-oxidising conditions. This may be done by applying a neutral atmosphere, in particular a hydrogen atmosphere. That may be necessary in order to prevent the formation of oxides of particles of the magnetizable layer, changing its electrical conductivity and other properties. Thereupon, after the magnetizable layer has been compacted, in particular highly sintered, we apply an oxidising treatment to the exposed surface of that layer. Thus, we heat the layer in open air, or we expose the highly sintered layer having closed pores and thereby a dense surface while still hot to air or other oxygen-containing gases. Preferably, we maintain the oxidising temperature long enough to have the exposed surface of the magnetizable layer covered by an oxide film of desired depth and density.

If the magnetizable layer does not consist of or does not contain sufficient material to form a coherent and dense oxide coating in the manner described above, then such materials capable of forming oxide may be admixed to the magnetizable layer, particularly to its outside surface. To this effect, the initial mixture of the magnetizable layer may consist of iron and about 5% to 20% aluminum. If exposed to oxidising conditions, the aluminum will form the very desirable insulating alumina and some iron oxide may be formed simultaneously, the film coating thus obtained consisting mainly of alumina and iron oxide. Instead of admixing the aluminum to the total mixture, we may first spread powdery iron group metal in a mold and there upon a relatively thin layer of powdery aluminum. The entire powdery layer thus prepared is then first compacted by pressure and then low temperature heat is applied under non-oxidising conditions so that the iron is fritted before the aluminum melts. Thereupon higher temperature heat is applied under oxidising conditions, the aluminum will now melt and be transformed into aluminum oxide, partially penetrating in either oxidic or metallic state into the outside of the pressed and fritted iron body. Thereby the unit is obtained which consists of a magnetizable layer of iron the outside of which is permeated by aluminum or aluminum oxide, which forms a dense and coherent insulating oxide coating.

Instead of admixing e. g. aluminum or covering the iron layer with a film of aluminum powder, other insulating compounds, in particular oxides, formed of substances comprising lithium, beryllium, strontium, barium, boron, silicon, titanium, zirconium, lead, thorium, tantalum, tin, cerium may be used in the same manner.

It appears therefrom that the admixtures which preferably form a minor portion of the initial mixture of the magnetizable layer, in particular between about 0.1% to 30% thereof, may be capable both of forming an insulating compound, in particular oxide, and of adjusting the electrical resistance and/or magnetic permeability of the magnetizable layer. Taking, for instance, titanium, it is of high electrical resistivity and capable of forming an oxide of high electrical resistance. Therefore, for instance, by admixing titanium in an amount of about 5% to 25% to the iron group metal of the magnetizable layer, the latter may be made suitable for alternating currents from the lowest to the highest frequencies, and at the same time form a very efficient insulating coating on the outside when exposed to oxidising conditions. By variation of the titanium content the electrical resistivity of the layer can be adjusted within a wide range whereas an effective titanium oxide coating will be produced also in case merely a small percentage, by weight, of titanium is admixed because the oxide is relatively voluminous. Similar views pertain to other admixtures, in particular aluminum, silicon and zirconium. Aluminum and silicon, if simultaneously admixed, are capable of forming very desirable oxide compounds in thinnest films. The high electrical resistance of metallic silicon may compensate for the low resistance of aluminum to any desired extent.

As mentioned above, we may also form such film coating on a layer, and, in addition thereto, an insulating layer of powdery material by compacting and simultaneously uniting it with an underlying film-coated magnetizable layer. The additional insulating layer may consist, entirely or in part, of compounds contained in the film produced on the magnetizable layer whereby coalescing of the additional layer and the film is facilitated.

In some cases we combine the compacting of a powdery insulating layer and formation of an insulating film-coating on the magnetizable layer by compacting a thin and somewhat porous insulating layer upon the compacted magnetizable layer under oxidizing conditions, at elevated temperature, the latter preferably conforming to sintering temperature of the material of the insulating layer, but being lower than melting temperature of the magnetizable layer.

Instead of compacting powdery material spread upon the magnetizable layer, we may proceed in such a way that the insulating material is liquefied and applied in as thin a sheet as possible upon the compacted magnetizable layer. Thus a sheet of vitreous mass, selected under views explained above, can be applied and solidified by cooling. Any desired viscosity of the sheet can be obtained by adjusting its temperature characteristics accordingly. Again, applying of a sheet of insulating material in liquefied state may be combined with transforming the outside of the magnetizable layer into an oxide or vitreous film.

Instead of compacting each layer separately by heat treatment, it may sometimes be preferable to compact the layers only by pressure, and to apply a heat treatment to a stack consisting of a plurality of such layers. The heat applied must suffice to combine the magnetizable layers into a unit which is permeable for the magnetizable flux, further to form a dense insulating layer which is impermeable for electric current and, finally, if desired, to unite all the layers into a solid unit which is self-supporting and of considerable mechanical strength.

Such a unit may consist of layers of a larger size, e. g. ten times the ultimately desired size and more. Such a body can then be subjected to a reducing treatment, such as rolling, preferably under heat. The temperature during rolling is preferably so chosen that the insulating layers are softened because when cold those layers are ordinarily brittle. As far as the magnetizable layers are concerned, the temperature is to be so chosen that the material contained in those layers does neither melt nor flow except if sufficient pressure is applied during the rolling process.

We have above described several features of a solid structure and material of substantial mechanical strength consisting of thin layers of magnetic material extending virtually parallel one to another all through one dimension, without appreciable magnetic interruption within the body proper. In assembling several such bodies gaps may occur. The layers of substantially magnetizable or even magnetized material are separated one from the other by a thin practically uninterrupted layer of electrically insulating material, preferably of metal oxide. Organic compounds may be used instead or in addition thereto where the temperatures applied during manufacture of the body remain below carbonization temperature of the organic compound, which is the case if compacting is in the main or exclusively accomplished by pressure. Metal-ceramic methods are applied for making the body which have never been used before in the manufacture of compact bodies, including alternate strata of conductive and non-conductive material. The magnetizable layers are made of iron group metal, preferably iron, but cobalt in amounts e. g. up to 35%, and nickel in amounts up to about 30%, may conveniently be added.

The body obtained is of considerable advantage over the ones known to the art. Due to the fact that pure material is used and retained through manufacture, a considerably higher permeability and maximum induction are obtainable. Due to the manufacture and application of extremely thin insulating layers such as formed of oxide films on the magnetizable layers, the space occupied by active magnetizable material is relatively increased. It is understood that according to the invention a single magnetizable layer can be made, or a unit consisting of a single magnetizable layer and one or two insulating layers applied to the magnetizable layer on one or both sides. However, according to the invention it is easy to manufacture a stack comprising a multitude of alternate magnetizable and insulating layers of any desired thinness, particularly in such a manner that they immediately form a coherent and mechanically strong body. Thereby the space factor is increased, and bodies are obtained which are self-supporting and, if desired, ready for immediate use. The same volume of a body according to my invention is capable of carrying a considerably larger amount of flux than according to the prior art; conversely, the same flux can be carried by a body of considerably smaller volume and weight, which is of utmost importance for many electrical designs.

The compacting of the bodies can be performed at the selected temperatures and pressures. Thereby the degree of density and some magnetic and electric properties of the final body can be adjusted. Lower heat can be compensated for by increased pressure, and vice versa, whereas material made for the purposes concerned by this invention was in general derived from castings which could be made only within a very narrow range of temperature. Furthermore, the bodies obtained can afterwards be heat-treated and/or mechanically treated, such as annealed and/or rolled when hot or cold, so as to cause any desired crystalline structure. In any process of manufacture described above, the insulating layers can be made to protrude over the magnetizable layers and to combine so that the magnetizable layers are all over enclosed by insulating material. If desired, a tightly adhering insulating cover, particularly consisting of oxide compound as used for insulating the layers from one another, can be applied to a body completed according to the invention.

As will be appreciated from the above, our invention permits the making of magnetizable layers of any desired composition, irrespective of particular casting and rolling conditions which are to be taken into consideration with known processes.

We are aware of the fact that cores of Pupin coils and similar purposes have been made by compacting iron group metal in its powdery state by sintering, or by compacting iron group metal particles by means of binders, in particular organic binders. Our invention has nothing in common with this known material which does not consist of alternate coherent strata of magnetizable and insulating material. Also, the processes of manufacturing are fundamentally different because the known process was not concerned with manufacturing virtually parallel layers consisting of almost diametrically different materials, and compacting the same.

It is to be understood that the invention is not limited to any exemplification herein contained but to be derived in its broadest aspect from the appended claims.

What we claim is:

1. A layered magnetizable mechanically self-supporting structure and material for electrical purposes, electrical machines, devices and articles, and parts thereof comprising a plurality of layers of contacting magnetically conducting particles and interposed between each pair of said magnetically conducting layers, a layer of compacted electrically insulating particles of a material which will sinter but not decompose at a temperature which will sinter the magnetically conducting particles, each of said magnetically conducting and electrically insulating layers being integrally bonded, as by sintering, into a unitary self-supporting sheet and said integrally bonded sheets being similarly bonded together to form a unitary solid self-supporting laminar magnetic structure.

2. A process for manufacturing a layered magnetizable mechanically self-supporting structure and material for electrical purposes, electrical machines, devices and articles, and parts thereof comprising forming a layer of contacting magnetically conducting sinterable particles, superposing upon said magnetically conducting layer, a layer of compacted electrically insulating particles of a material which will sinter but not decompose at a temperature which will sinter the magnetically conducting particles, superposing upon said layers alternate magnetically conducting and electrically insulating layers respectively similar to the first and second said layers, and sintering the layered mass, thereby bonding each of said magnetically conducting and electrically insulating layers into a unitary self-supporting sheet and simultaneously therewith bonding the sheets together to form a unitary solid self-supporting laminar magnetic structure.

3. A layered magnetizable mechanically self-supporting structure and material for electrical purposes, electrical machines, devices and articles, and parts thereof comprising a plurality of layers of contacting magnetically conducting iron group metal particles and interposed between each pair of said magnetically conducting layers, a layer of compacted electrically insulating inorganic mineral oxide particles, each of said magnetically conducting and electrically insulating layers being integrally bonded, as by sintering, into a unitary self-supporting sheet and said integrally bonded sheets being similarly bonded together to form a unitary solid self-supporting laminar magnetic structure.

4. A layered magnetizable mechanically self-supporting structure and material for electrical purposes, electrical machines, devices and articles, and parts thereof comprising a plurality of layers of contacting magnetically conducting iron group metal particles having a size within the limits 1 to 300 microns and interposed between each pair of said magnetically conducting layers, a layer, thinner than each of said magnetically conducting layers, of compacted electrically insulating inorganic mineral oxide particles, each of said magnetically conducting and electrically insulating layers being integrally bonded, as by sintering, into a unitary self-supporting sheet and said integrally bonded sheets being similarly bonded together to form a unitary solid self-supporting laminar magnetic structure.

EMIL E. MAYER.
PAUL SCHWARZKOPF.